(12) United States Patent
Imamura

(10) Patent No.: US 6,916,265 B2
(45) Date of Patent: Jul. 12, 2005

(54) POWER TRANSFER APPARATUS

(75) Inventor: Masahiro Imamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/668,144

(22) Filed: Sep. 24, 2003

(65) Prior Publication Data

US 2004/0058776 A1 Mar. 25, 2004

(30) Foreign Application Priority Data

Sep. 25, 2002 (JP) .................................... P. 2002-278836

(51) Int. Cl.[7] .............................................. F16H 3/56
(52) U.S. Cl. ....................... 475/142; 475/328; 475/339
(58) Field of Search ................................ 475/140, 142, 475/324, 326, 328, 339

(56) References Cited

U.S. PATENT DOCUMENTS

| | | | | |
|---|---|---|---|---|
| 1,674,557 A | * | 6/1928 | Maybach ..................... | 475/142 |
| 3,561,291 A | * | 2/1971 | Webster et al. ............. | 475/142 |
| 4,290,322 A | * | 9/1981 | Huitema ..................... | 475/128 |
| 4,567,788 A | * | 2/1986 | Miller ......................... | 475/142 |
| 4,774,857 A | * | 10/1988 | Heine et al. ................ | 475/142 |
| 4,862,363 A | * | 8/1989 | Krisher et al. ............... | 701/59 |
| 6,790,152 B2 | * | 9/2004 | Mori et al. .................. | 475/142 |

FOREIGN PATENT DOCUMENTS

| JP | 7-61779 | 7/1995 |
|---|---|---|
| JP | 7-64219 | 7/1995 |

* cited by examiner

Primary Examiner—Sherry Estremsky
(74) Attorney, Agent, or Firm—Westerman, Hattori, Daniels & Adrian, LLP

(57) ABSTRACT

A power transfer apparatus including a clutch having a biasing device for biasing the clutch piston in a direction in which the clutch discs engage with the clutch plates, a transmission brake disposed in line in an axial direction of the clutch, an actuator disposed in line in an axial direction of the transmission brake for disengaging the clutch at the same time of applying the transmission brake, and a planetary carrier sub-assembly disposed in line in the axial direction of the clutch, wherein the power transfer apparatus provided between an input shaft and an output shaft which are accommodated within a casing for selectively changing the speed of the output shaft.

19 Claims, 18 Drawing Sheets

POWER TRANSFER APPARATUS

BACKGROUND OF THE INVENTION

1. Field of the Invention

The present invention relates to a power transfer apparatus for secondary or coupled driving wheels of a four-wheel drive vehicle.

2. Description of the Related Art

In conventional four-wheel drive vehicles, in turning a corner of a small turning radius at low or middle speed in a four-wheel driving mode, there is caused a difference in wheel speed between front and rear wheels which is attributed to a difference in turning radius between the front and rear wheels, resulting in the occurrence of a tight corner braking phenomenon.

Front and rear wheels driving systems disclosed in JP-B-7-61779 and JP-B-7-64219 are known as related arts for solving the problem of tight corner braking phenomenon.

In the front and rear wheels driving systems disclosed in the Japanese Examined Patent Publications, an average wheel speed of secondary driving wheels relative to an average wheel speed of primary driving wheels is adjusted by providing a transfer (a speed increasing system) between the primary and secondary driving wheels.

In this transmission, by switching on and off a direct connective clutch and a transmission clutch, there occurs a switch between a direct connecting mode in which the average wheel speed of the primary driving wheels and the average wheel speed of the secondary driving wheels are almost equalized and a speed increasing mode in which the average wheel speed of the secondary driving wheels is made larger than the average wheel speed of the primary driving wheels.

In this front and rear wheels driving system, when turning a small corner in the four-wheel driving mode, the occurrence of tight corner braking phenomenon is prevented by bringing the secondary driving wheels in the speed increasing mode by the transmission.

Incidentally, in the aforesaid transfer (the speed increasing apparatus) for four-wheel drive vehicles, at least two hydraulic or electromagnetic actuators are required as a power source for operating the direct connective clutch and the transmission clutch, and this leads to a problem that the transmission itself is made larger in size and hence heavier in weight.

Furthermore, in this transmission, since constituent components are assembled piece by piece in the assembling processes of the transmission, the number of processes is increased and hence the productivity is deteriorated. In addition, since there are many items needing adjustments such as clearance and spring load, the productivity is also deteriorated.

SUMMARY OF THE INVENTION

Consequently, an object of the present invention is to provide power transfer apparatus that can be made smaller in size and lighter in weight overall.

According to the first aspect of the present invention, there is provided a power transfer apparatus provided between an input shaft and an output shaft for selectively changing the speed of the output shaft relative to the speed of the input shaft.

The power transfer apparatus system includes a clutch for directly connecting the input shaft to the output shaft, a transmission brake serially disposed in an axial direction of the clutch, an actuator serially disposed in an axial direction of the transmission brake for disengaging the clutch at the same time of activating the transmission brake and a planetary carrier sub-assembly serially disposed in the axial direction of the clutch.

The clutch has a clutch inner hub fixed to the input shaft, a clutch guide, a plurality of clutch discs attached to the clutch inner hub, a plurality of clutch plates attached to the clutch guide so as to be disposed alternately with the clutch discs, a clutch piston and a biasing unit for biasing the clutch piston in a direction in which the clutch discs engage with the clutch plates.

The transmission brake has a brake inner hub coupled with the clutch piston at one end thereof, a plurality of brake discs attached to the brake inner hub and a plurality of brake plates attached to the casing so as to be disposed alternately with the brake discs.

The planetary carrier sub-assembly has a planetary carrier rotatably disposed around the input shaft and the output shaft and coupled with the clutch guide, a first pinion gear rotatably carried on the planetary carrier, a second pinion gear having the number of teeth which is different from that of the first pinion gear, a first sun gear fixed to the input shaft and meshing with the first pinion gear and a second sun gear fixed to the output shaft and meshing with the second pinion gear.

According to the power transfer apparatus of the first aspect of the present invention, since the single actuator can be used to disengage the clutch at the same time of activating the transmission brake, it is possible to provide a power transfer apparatus which is made smaller in size and light in weight. In addition, since the clutch and the transmission brake are serially disposed in the axial direction, the outside diameter of the power transfer apparatus can be made small.

Furthermore, when the actuator is activated, since the engagement of the clutch is gradually released while the transmission brake is gradually activated, the transfer of power from the input shaft to the output shaft is never interrupted, and the occurrence of a gearshift shock can be prevented.

Note that in the above mentioned power transfer apparatus, the first and second pinion gears may be formed integrally.

According to the second aspect of the present invention, the power transfer apparatus wherein the clutch further has a one-way clutch interposed between the clutch inner hub and the clutch guide.

Thus, since the one-way clutch is interposed between the clutch inner hub and the clutch guide, a load generated when the input shaft is connected to the output shaft can be partly borne by the one-way clutch, and therefore the load capacity of the clutch can be reduced.

According to the third aspect of the present invention, there is provided a power transfer apparatus as set forth in the first aspect of the present invention, wherein the clutch piston is disposed within a space defined between the clutch guide and a radial outer side of the clutch plates so as to be extend axially.

According to the construction, even if a power transfer member such as the clutch inner hub is disposed on the inner diameter side, the (on and off) control of the clutch can be implemented on the outside diameter side.

DETAILED DESCRIPTION OF THE PREFERRED EMBODIMENTS

Figure 1:
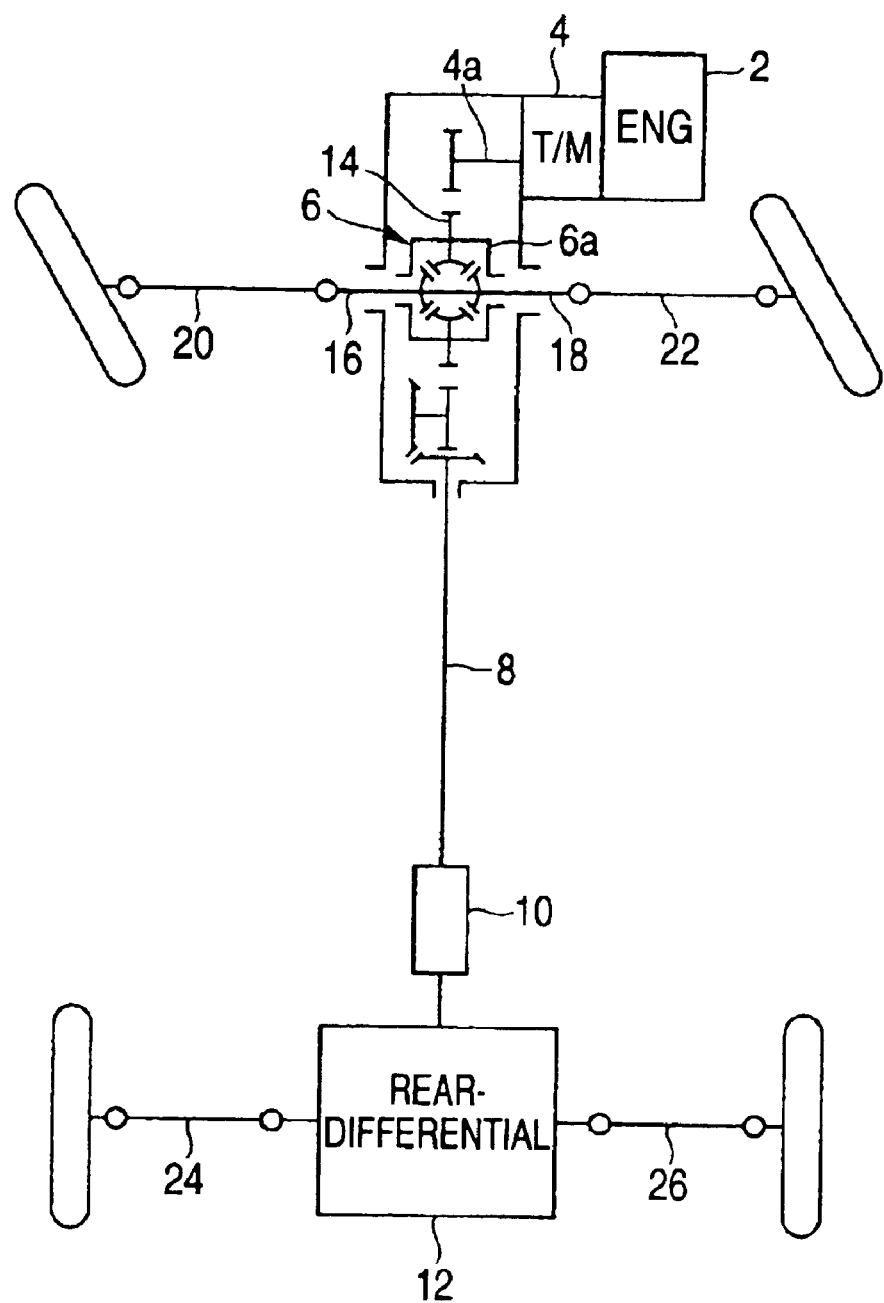
FIG. 1 is a schematic view of a power train of a four-wheel drive vehicle which is suitable for application of a power transfer apparatus according to the present invention.

Referring to FIG. 1, there is shown a schematic view of a power train for a wheel-drive vehicle built based on a front-engine, front-drive (FF) vehicle to which a speed increasing apparatus (a power transfer apparatus) according to the present invention.

What should be noticed here is that the present invention is not limited to a four-wheel drive vehicle which is built based on the FF vehicle but may be applied to a four-wheel drive vehicle built based on a rear-engine, rear-drive (RR) vehicle or a front-engine, rear-drive (FR) vehicle.

As shown in FIG. 1, a power train according to an embodiment according to the present invention mainly includes a front differential 6 and a rear differential 12 and a power transfer apparatus of the present invention. The power or drive from an engine 2 disposed at the front of the vehicle is transmitted from an output shaft 4 a of a transmission 4 to the front differential 6. A power transfer apparatus or a speed increasing apparatus (a transmission) 10 according to the present invention to which the power so transmitted to the front differential 6 is then transmitted via a propeller shaft 8. The power from the speed increasing apparatus is 10 transmitted to the rear differential 12.

The front differential 6 has a conventionally known construction in which power from the output shaft 4 a of the transmission 4 is transmitted to left and right front drive axles 20, 22 via a plurality of gears 14 within a differential case 6 a and output shafts 16, 18, whereby left and right front wheels are driven, respectively.

As will be described later on, the rear differential 12 includes a pair of planetary gear sets and a pair of electromagnetic actuators adapted for controlling the application of multi-plate brake mechanisms respectively, and left and right rear wheels are driven by virtue of power transmitted to left and rear wheel drive axles 24, 26 by controlling the electromagnetic actuators.

Figure 2:
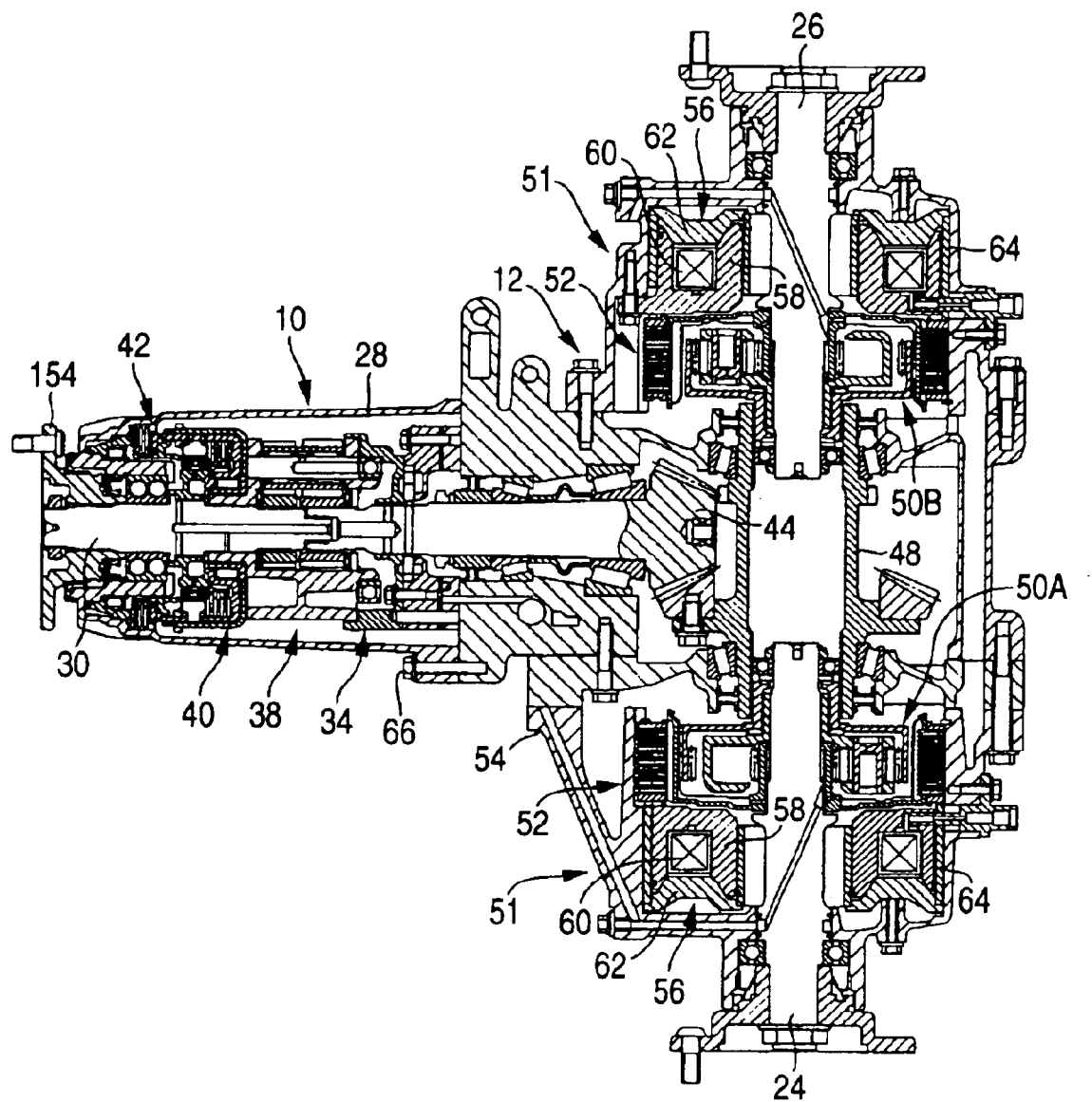
FIG. 2 is a cross-sectional view of the power transfer apparatus (transmission) and a rear differential according to an embodiment of the present invention.

FIG. 2 shows a cross-sectional view of the speed increasing apparatus 10 of the present invention and the rear differential 12 disposed on a downstream side of the speed increasing apparatus 10. The speed increasing apparatus 10 includes an input shaft 30 rotatably mounted in a casing 28 and an output shaft (hypoid pinion shaft) 32.

The speed increasing apparatus 10 includes further an oil pump sub-assembly 34, a planetary carrier sub-assembly 38, a (directly connective) clutch sub-assembly 40, and a transmission brake 42.

The rear differential 12 disposed on the downstream side of the transmission 10 has a hypoid pinion gear 44 formed on a distal end of the hypoid pinion shaft 32.

The hypoid pinion gear 44 meshes with a hypoid ring gear 48, and power from the hypoid ring gear 48 is inputted into ring gears of a pair of left and right planetary gear sets 50A, 50B.

Sun gears of the planetary gear sets 50A, 50B are rotatably mounted around the left rear axle 24 and the right rear axle 26, respectively. Planetary carriers of the planetary gear sets 50A, 50B are fixed to the left rear axle 24, and the right rear axle 26, respectively. A planet gear carried on the planetary carrier meshes with the sun gear and the ring gear.

The left and right planetary gear sets 50A, 50B are connected, respectively, to brake mechanisms 51 each provided for variably controlling the torque of the sun gear. The brake mechanism 51 includes a wet multi-plate brake 52 and an electromagnetic actuator 56 for actuating the multi-plate brake 52.

Brake plates of the wet multi-plate brake 52 are fixed to a casing 54, and brake discs thereof are fixed to the sun gear of the planetary gear set 50A, 50B.

The electromagnetic actuator 56 is made up of a core (yoke) 58, an electromagnetic coil 60 inserted into the core 58, an armature 62 and a piston 64 connected to the armature 62.

When current is applied to the electromagnetic coil 60, the armature 62 is attracted to the core 58 by the coil 60 to thereby generate a thrust. The piston 64 integrally connected to the armature 62 is caused to press against the multi-plate brake 52 by virtue of the thrust so generated, whereby a brake torque is generated.

As this occurs, the sun gears of the planetary gear sets 50A, 50B are fixed relative to the casing 54, respectively, and a driving force of the hypoid pinion shaft 32 is transmitted to the left and right rear axles 24, 26 via the ring gears, planet gears and planetary carriers of the planetary gear sets 50A, 50B.

Output torques to the left and right rear axles 24, 26 can be variably controlled by varying current applied to the electromagnetic coil 60.

Next, referring to FIG. 3, the construction of the speed increasing apparatus 10 will be described in detail. The casing 28 of the speed increasing apparatus 10 is fixed to the casing 54 of the rear differential 12 with a bolt 66.

The oil pump sub-assembly 34 includes a base 68, an oil pump body 70 and a cover 72. The cover 72 is fixed to the oil pump body 70 with a bolt 76. The oil pump sub-assembly 34 is fixed to the casing 54 of the rear differential 12 with a bolt 74.

The oil pump sub-assembly 34 is made up of a trochoidal pump, and the oil pump body 70 has an outer rotor having internal teeth and an inner rotor having external teeth. An oil pump driving pin 36 is fitted in the inner rotor.

The planetary carrier sub-assembly 38 includes a planetary carrier 78 rotatably mounted around the input shaft 30 and the output shaft 32 via bearings 80.

The planetary carrier 78 has a shaft 82, and a small-diameter pinion gear (a first pinion gear) 84 and a large-diameter pinion gear (a second pinion gear) 86 which are both integrally formed around the shaft 82 are rotatably mounted on the planetary carrier 78.

The small-diameter pinion gear 84 meshes with a first sun gear 88 which is fixed to the input shaft 30 with splines 90, 92, whereas the large-diameter pinion gear 86 meshes with a second sun gear 94 which is fixed to the output shaft 32 with splines 96, 98.

Figure 4:
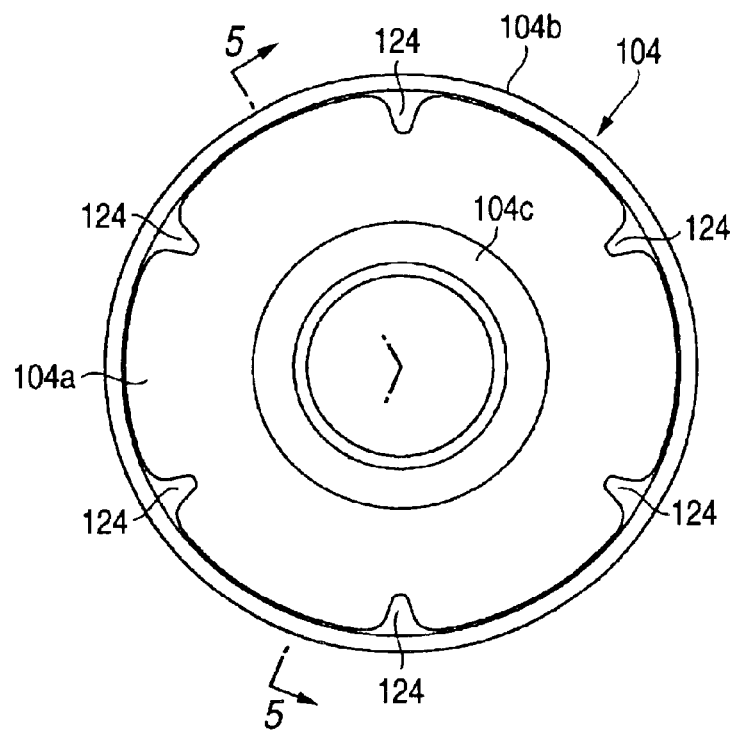
FIG. 4 is a front view of a clutch guide.

The direct connective clutch sub-assembly 40 includes a clutch guide 104 which is fixed to the planetary carrier 78 with splines 100, 102. FIG. 4 is a front view of the clutch guide 104, FIG. 5 is a cross-sectional view taken along the line 5—5 in FIG. 4, and FIG. 6 is a rear view of the clutch guide 104.

Figure 5:
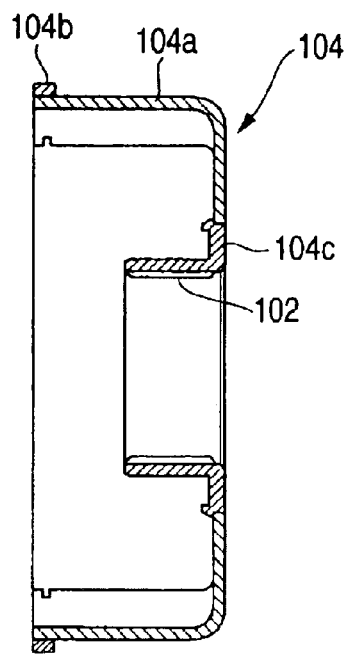
FIG. 5 is a cross-sectional view taken along the line 5—5 in FIG. 4.

As shown best in FIG. 5, the clutch guide 104 has an outer circumferential clutch guide 104a, a ring 104b welded to the outer circumferential clutch guide 104a and an inner circumferential clutch guide 104c fixed to the outer circumferential clutch guide 104a. The inner circumferential clutch guide 104c has splines 102.

Figure 6:
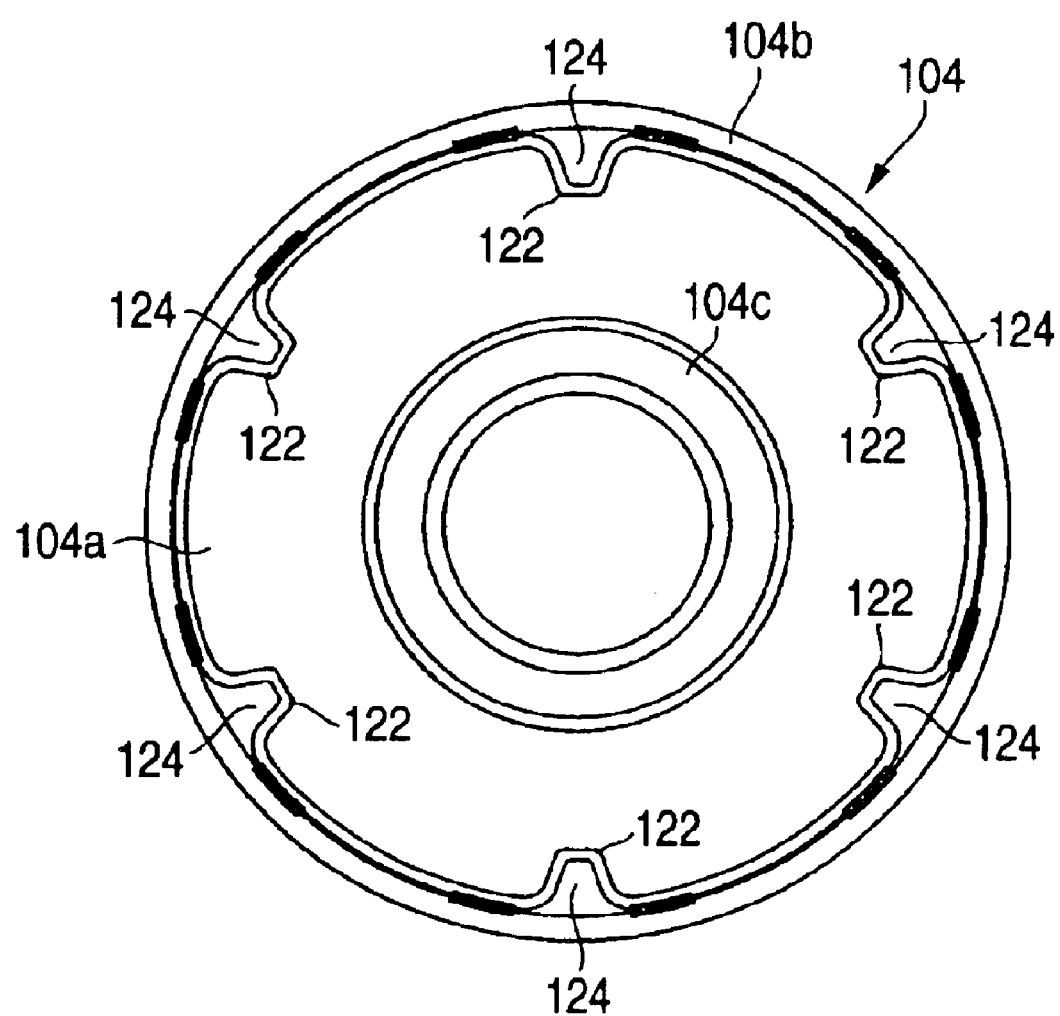
FIG. 6 is a rear view of the clutch guide.

As shown best in FIG. 6, the clutch guide 104 has six protruding portions 122 which protrude in radial direction. Recesses 124 are disposed between the protruding portions 122 and the ring 104b.

Referring to FIG. 3 again, the direct connective clutch sub-assembly 40 has a clutch inner hub 106 that is fixed to the input shaft 30 with splines 108, 110. A plurality of clutch discs 112 are mounted on an outer circumferential portion of the clutch inner hub 106 so as not to rotate relative to the clutch inner hub 106 but to move in an axial direction of the same.

Furthermore, a plurality of clutch plates 114 are mounted on the clutch guide 104 so as not to rotate but to move in the axial direction, and are disposed such that the clutch plates 114 alternate with the clutch discs 112.

Figure 7:
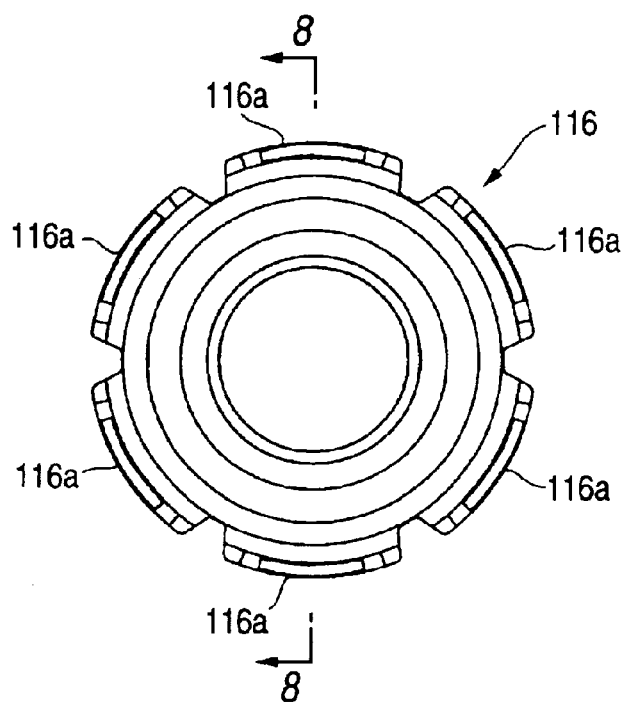
FIG. 7 is a front view of a clutch piston.
Figure 8:
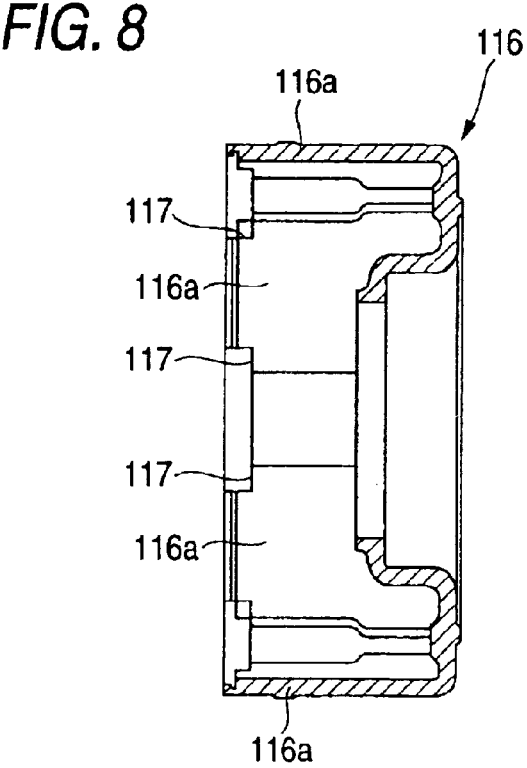
FIG. 8 is a cross-sectional view taken long the line 8—8 in FIG. 7.

A clutch piston 116 is disposed within a space defined between the clutch guide 104 and a radial out side of the clutch discs 112 so as to be extended in the axial direction. As shown in FIGS. 7 and 8, the clutch piston 116 has six protruding portions 116a each of which extends in the axial direction.

Each protruding portion 116a has a shoulder 117 on each side of the protruding portion 116 in the vicinity of a distal end thereof. A coil spring 118 is interposed between the clutch guide 104 and the clutch piston 116 for biasing the clutch piston 116 in a direction in which the clutch discs 112 and the clutch plates 114 are brought into engagement with each other.

Figure 9:
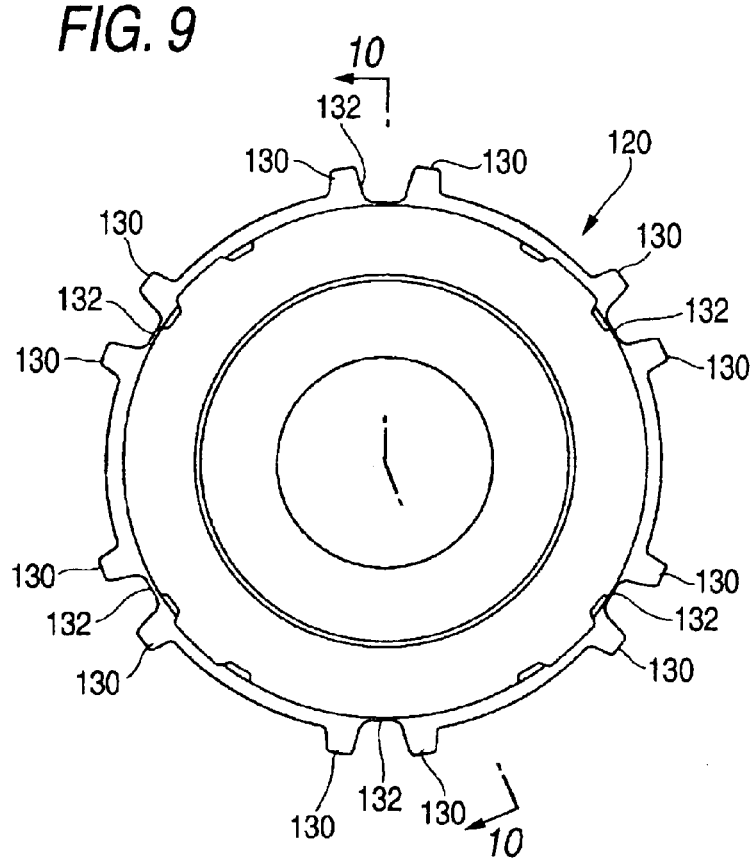
FIG. 9 is a front view of a one-way clutch.
Figure 10:
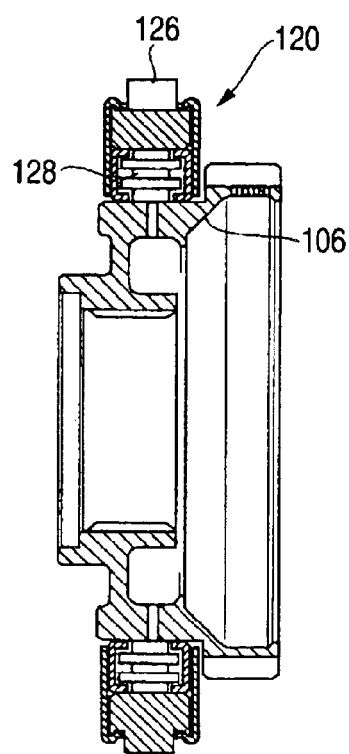
FIG. 10 is a cross-sectional view taken along the line 10—10 in FIG. 9 showing a state in which the one-way clutch is mounted on a clutch inner hub.

A one-way clutch 120 is interposed between the clutch inner hub 106 and the clutch guide 104 of the direct connective clutch sub-assembly 40. FIG. 9 is a front view of the one-way clutch 120, and FIG. 10 is a cross-sectional view taken along the line 10—10 in FIG. 9.

An outer ring 126 of the one-way clutch 120 is fixed to the clutch guide 104, and an inner ring 128 thereof is fixed to the clutch inner hub 106.

As shown in FIG. 9, the outer ring 126 of the one-way clutch 120 has a plurality of projections 130, and a recess 132 is imposed between a pair of adjacent projections 130.

The one-way clutch 120 is such as to transmit a torque in one direction when the rotational speed of the input shaft 30 is equal to or larger than the rotational speed of the clutch guide 104 which is located on the output side.

Figure 3:
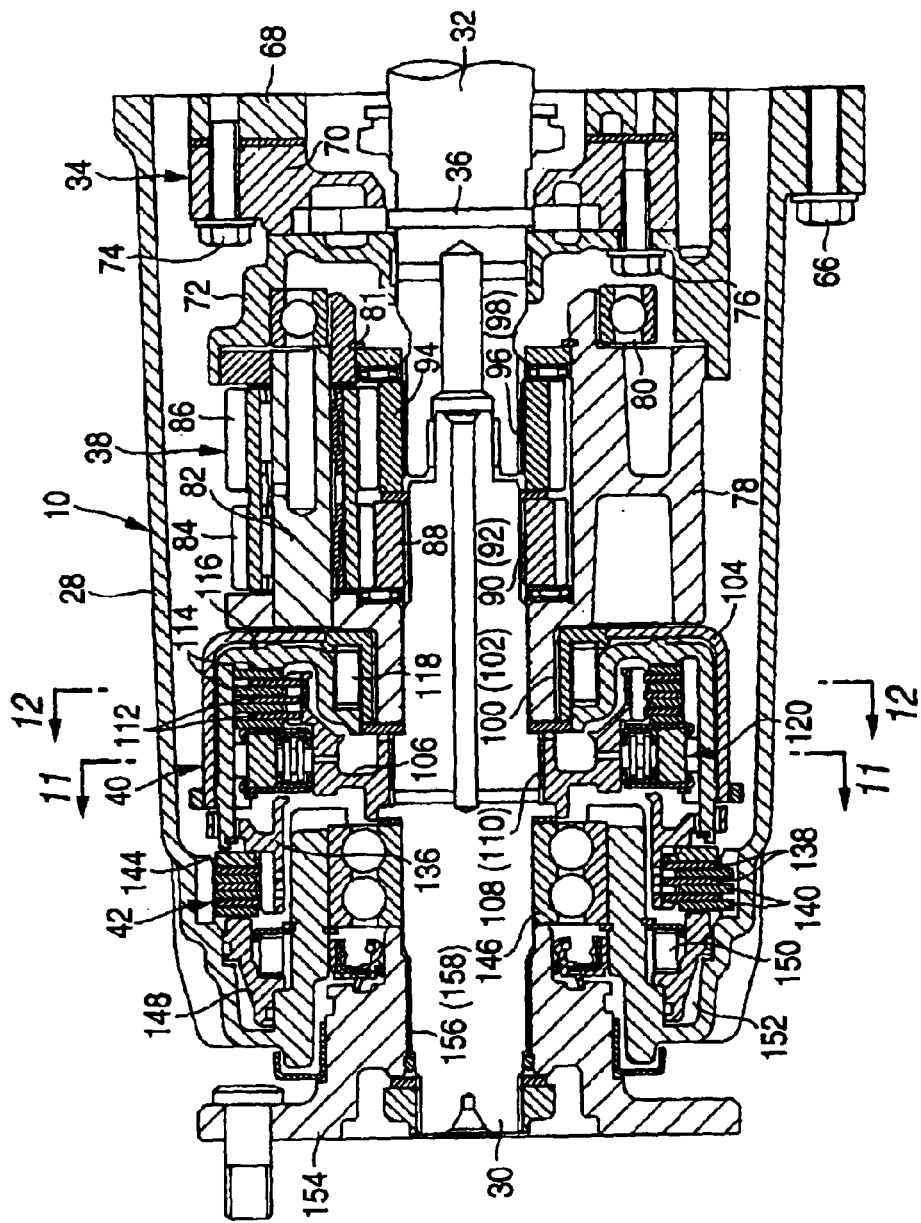
FIG. 3 is an enlarged cross-sectional view of the power transfer apparatus according to the embodiment of the present invention.
Figure 11:
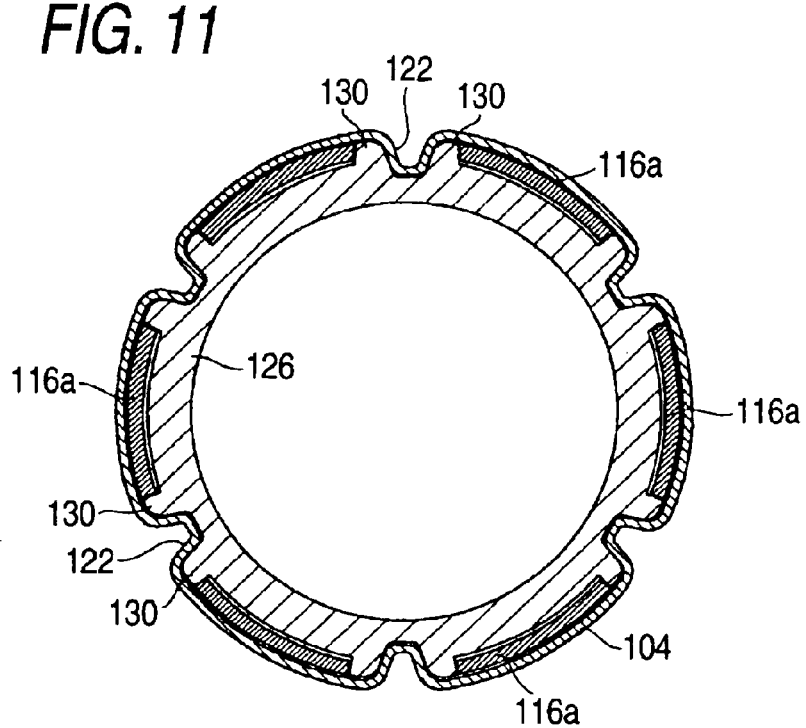
FIG. 11 is a cross-sectional view taken along the line 11—11 in FIG. 3.

Referring to FIG. 11, a cross-sectional view taken along the line 11—11 in FIG. 3 is shown. The axially protruding portions 116a of the clutch piston 116 are inserted into between the clutch guide 104 and the outer ring 126 of the one-way clutch 120.

Furthermore, the protruding portions 122 of the clutch guide 104 fit in between the pairs of projections 130 on the outer ring 126 of the one-way clutch 120, respectively, and torque is transmitted from the outer ring 126 of the one-way clutch 120 to the clutch guide 104 at these fitting portions.

Figure 12:
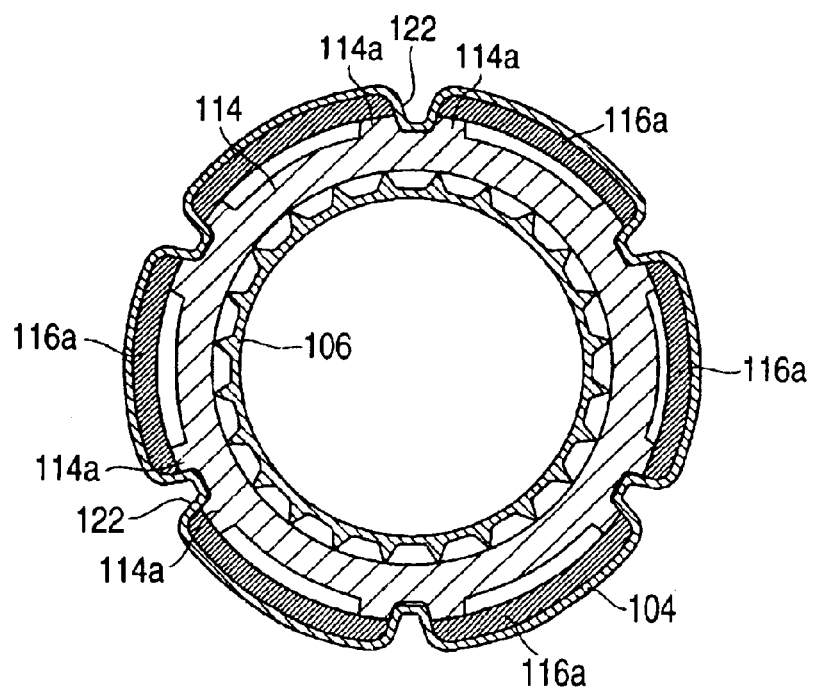
FIG. 12 is a cross-sectional view taken along the line 12—12 in FIG. 3.

Referring to FIG. 12, a cross-sectional view taken along the line 12—12 in FIG. 3 is shown. The axially protruding portions 116a of the clutch piston 116 are inserted into between the clutch plates 114 and the clutch guide 104.

The clutch plate 114 has a plurality of projections 114a which are formed on an outer circumferential side thereof, and the protruding portions 122 of the clutch guide 104 fit in between pairs of adjacent projections 114a, respectively, whereby the clutch plate 114 is mounted on the clutch guide 104 so as not to rotate but to move in the axial direction.

Figure 13:
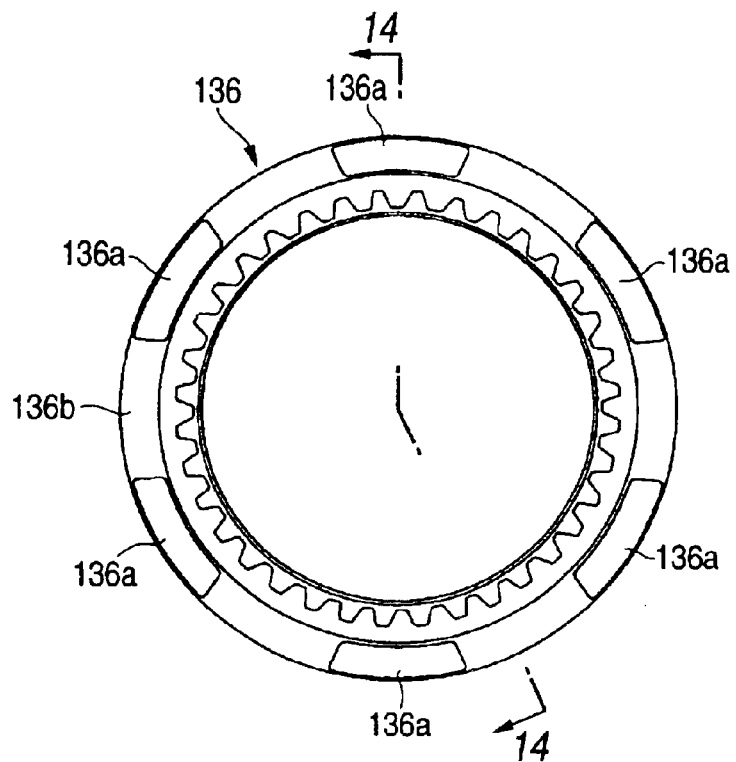
FIG. 13 is a front view of the brake inner hub.
Figure 14:
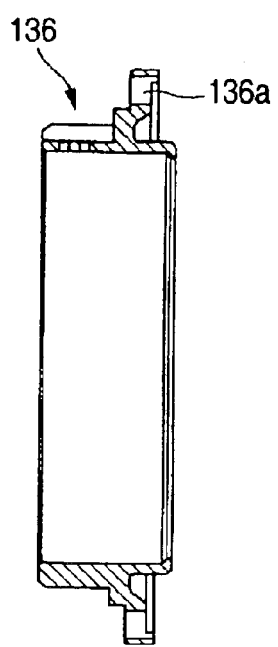
FIG. 14 is a cross-sectional view taken along the line 14—14 in FIG. 13.

Referring back to FIG. 3, again, reference numeral 42 denotes a transmission brake, and an end of a brake inner hub 136 of the transmission brake 42 is in engagement with the clutch piston 116. FIG. 13 shows a front view of the brake inner hub 136, and FIG. 14 shows a cross-sectional view of the brake inner hub 136 taken along the line 14—14 in FIG. 13.

As shown in FIG. 13, the brake inner hub 136 has six holes 136a which are spaced apart from each other in a circumferential direction. The axially protruding portions 116a of the clutch piston 116 shown in FIG. 8 are inserted into the holes 136a of the brake inner hub 136, respectively, whereby the brake inner hub 136 is restricted from moving in an axially rightward direction when the brake inner hub 136 is brought into abutment with the shoulders 117 of the clutch piston 116.

A plurality of brake discs 138 are mounted on the brake inner hub 136 so as not to rotate relative to the clutch inner hub 136 but to move in the axial direction of the same. Furthermore, a plurality of brake plates 140 are mounted on the casing 28 so as not to rotate but to move in the axial direction and are disposed such that the brake plates 140 alternate with the brake discs 138. An end plate 144 is interposed between the brake inner hub 136 and the right-most brake disc 138.

Reference numeral 148 denotes a hydraulic piston functioning as an actuator, which activates the transmission brake 42 when moved rightward by virtue of an oil pressure introduced into an oil pressure chamber 152. The oil pressure so introduced into the oil pressure chamber 152 is supplied from the oil pump sub-assembly 34. The hydraulic piston 148 is normally biased by a coil spring 150 in a direction in which the application of the transmission brake 42 is released.

A companion flange 154 is fixed to the input shaft 30 by means of splines 156, 158. The companion flange 154 is coupled with the propeller shaft 8 shown in FIG. 1.

Figure 15:
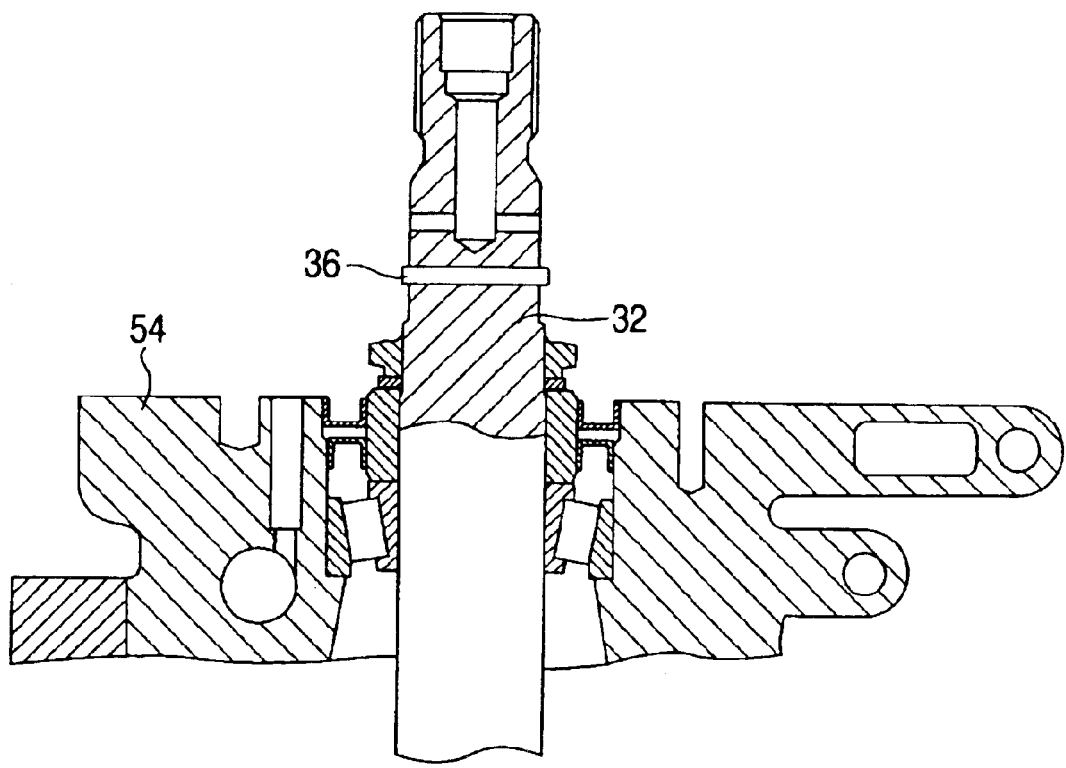
FIG. 15 is a cross-sectional view showing a process for assembly of an oil pump driving pin.

Next, referring to FIGS. 15 to 22, an assembling procedure of the speed increasing apparatus 10 according to the present invention which has been described heretofore will be described. Firstly, as shown in FIG. 15, the oil pump driving pin 36 is assembled to the hypoid pinion shaft (the output shaft) 32 of the rear differential 12, which has not yet been assembled into the casing 54.

Figure 16:
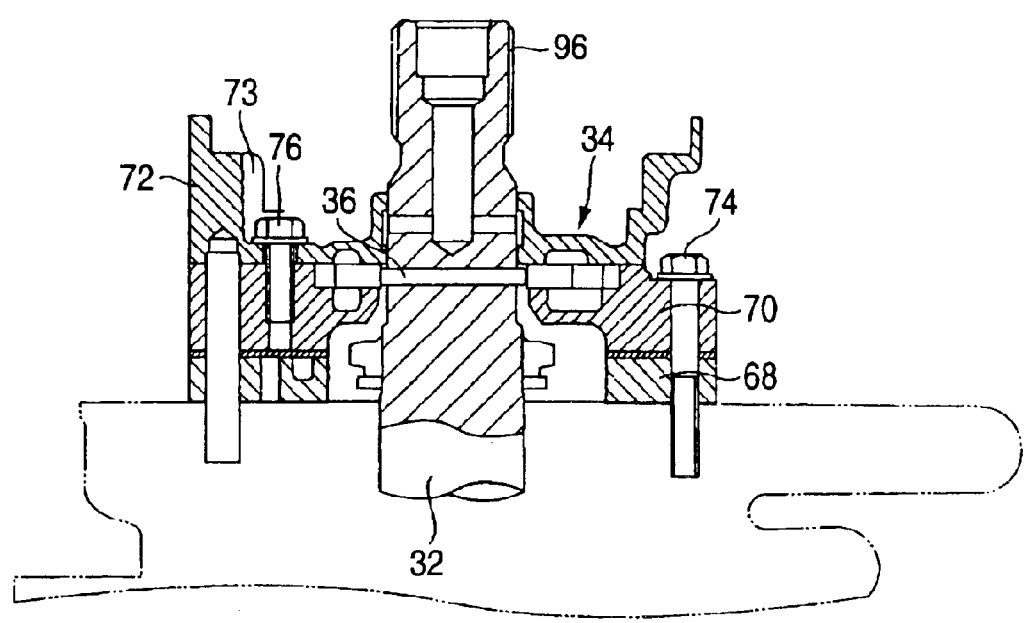
FIG. 16 is a cross-sectional view showing a process for assembly of an oil pump sub-assembly.

Next, as shown in FIG. 16, the oil pump sub-assembly 34 is assembled to the rear differential 12, and the bolt 74 is tightened. As this occurs, the oil pump driving pin 36 fits in the inner rotor which is incorporated in the oil pump main body 70.

Thus, the function of the oil pump itself can be verified by constituting a primary complete body in which the base 68, the oil pump body 70 and the cover 72 are assembled and installed together with the other associated components to be incorporated as the oil pump sub-assembly 34. In addition, since the assembled state of the oil pump is maintained during a transportation, the oil pump sub-assembly 34 so assembled as the primary complete body is also effective when assembling oil pumps at a location which is far away from the final assembly line.

Figure 17:
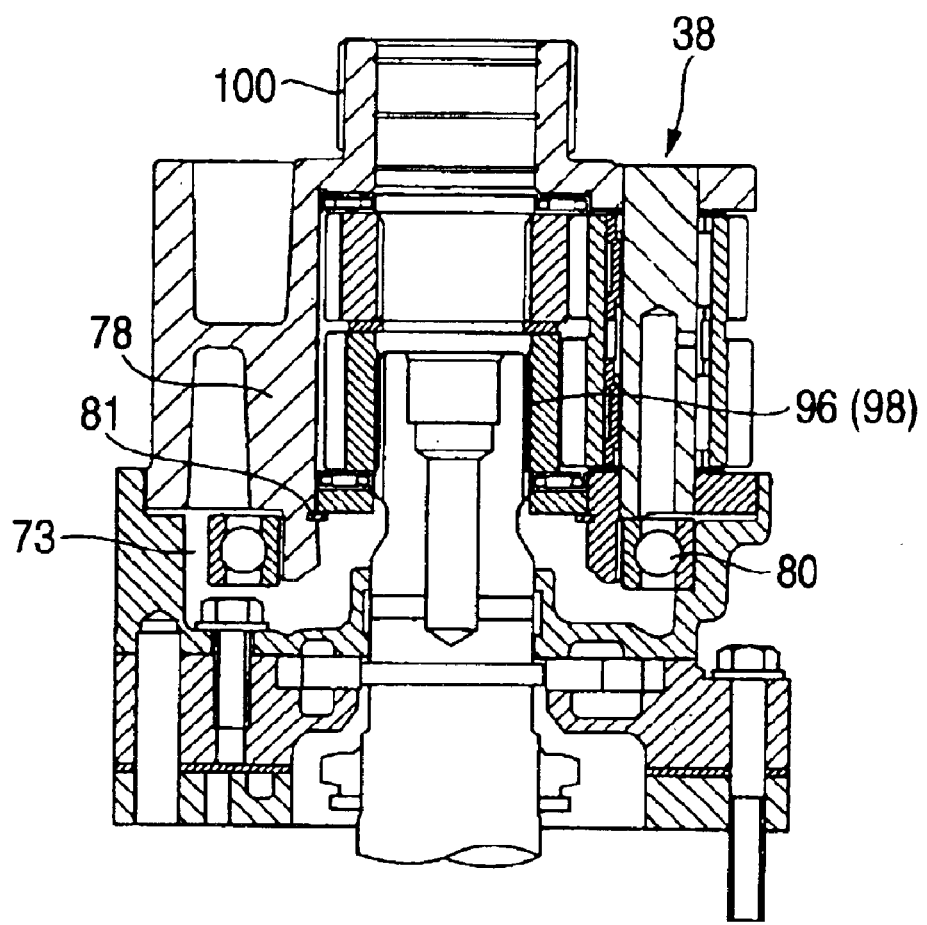
FIG. 17 is a cross-sectional view showing a process for assembly of a planetary carrier sub-assembly.

Next, as shown in FIG. 17, the planetary carrier sub-assembly 38 is assembled to a bearing supporting portion 73 (refer to FIG. 16) disposed on the oil pump cover 72. As this occurs, the splines 98 of the second sun gear 94 and the splines 96 of the hypoid pinion gear shaft 32 come to fit together.

Thus, the components to be incorporated such as the pinion gears 82, 86, the sun gears 88, 94 and the bearings 80 are fixed by a circlip 81 after the components have been assembled in place onto the planetary carrier 78, whereby the planetary carrier sub-assembly 38 can be completed as the primary complete body.

Consequently, the meshing conditions between the pinion gears 84, 86 and the sun gears 88, 94 and the thrust clearance can be verified on the planetary carrier sub-assembly 38. In addition, since the assembled condition of the planetary carrier sub-assembly 38 is maintained during transportation, the planetary carrier sub-assembly 38 thus assembled as the primary complete body is also effective when assembling oil pumps at a location which is far away from the final assembly line.

Figure 18:
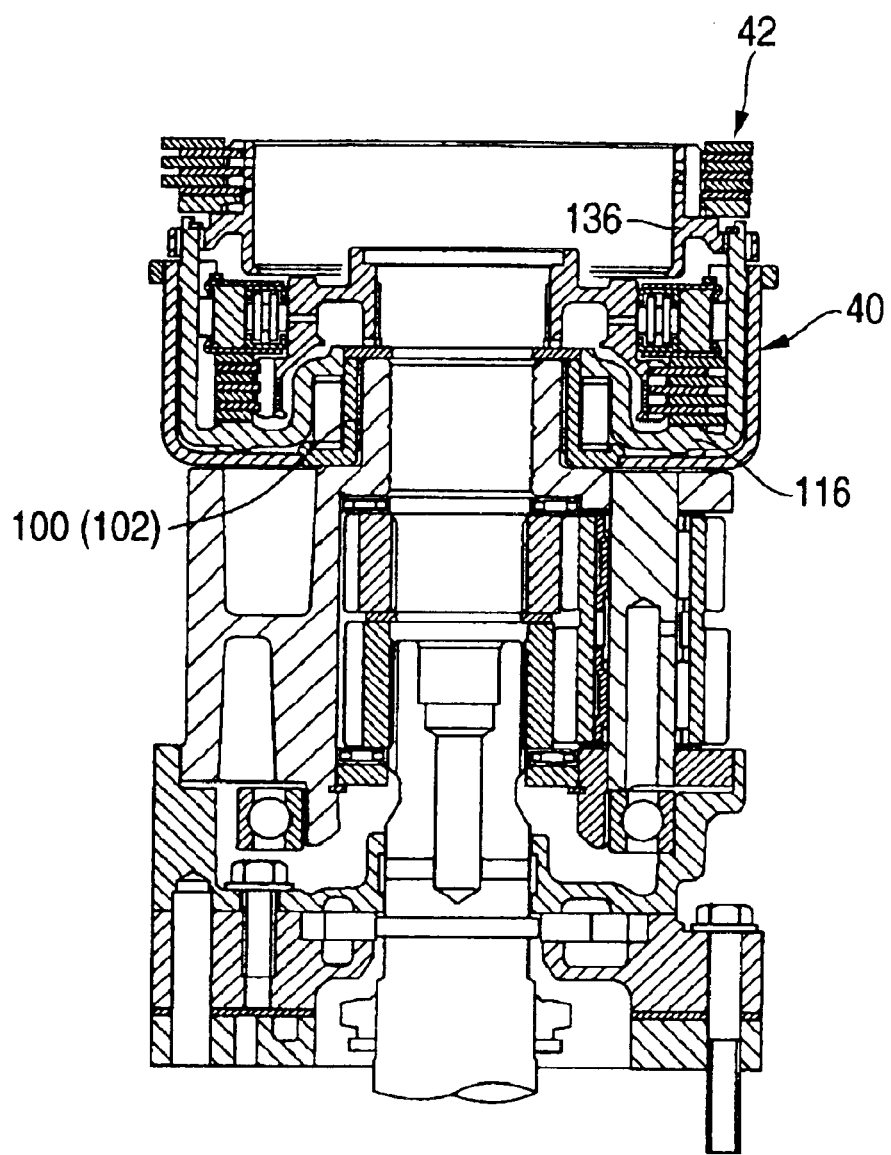
FIG. 18 is a cross-sectional view showing a process for assembly of a direct connective clutch sub-assembly.

Next, as shown in FIG. 18, the direct connective clutch sub-assembly 40 is assembled to splines 100 (refer to FIG. 17) of the planetary carrier 78. Furthermore, the transmission brake 42 is assembled to the direct connective clutch sub-assembly 40.

Namely, the brake inner hub 136 of the transmission brake 42 is brought into engagement with the piston 116 of the direct connective clutch sub-assembly 40, and the brake discs and the brake plates are mounted on the brake inner hub 136 in such a manner that the discs and the plates alternate with each other.

The clutch torque (which is determined by a set load of the coil spring 118 ) of the (direct connective) clutch 40 needs to be controlled at a certain value. To make this happen, while the clutch discs 112 and the clutch plates 114 need to be installed by selecting thicknesses thereof, performing this process during assembling processes of the whole rear differential 12 leads to a deterioration in working efficiency of the total assembly operation.

However, in this embodiment, since the clutch discs 112 and the clutch plates 114 are assembled as a part of the direct connective clutch sub-assembly 40, the aforesaid process can be separated from the assembling processes of the whole rear differential 12. In addition, since the assembled condition of the direct connective clutch sub-assembly 40 can be maintained during transportation, this arrangement is also effective when attempting to assemble rear differentials at a location which is far away from the final assembly line.

Figure 19:
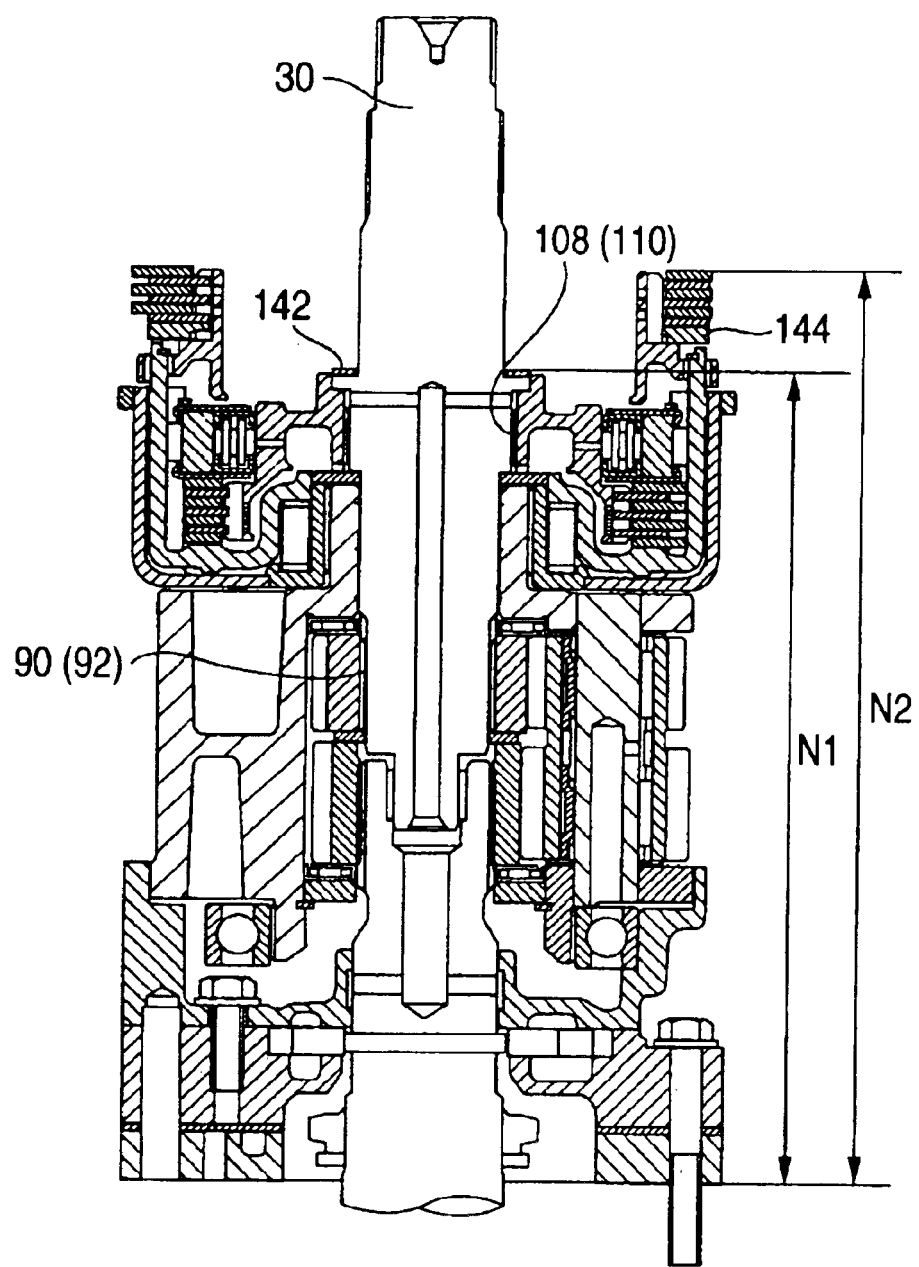
FIG. 19 is a cross-sectional view showing processes for inserting an input shaft and measuring N1, N2.

Next, as shown in FIG. 19, the input shaft 30 is inserted. As this occurs, the input shaft 30 fits in place in the first sun gear 88 at the splines 90, 92. In addition, the input shaft 30 also fits in place in the clutch inner hub 106 of the direct connective clutch sub-assembly 40 at the splines 108, 110.

In this condition, heights N1, N2 in FIG. 19 are measured. Namely, the height N1 from the casing 54 to a shim 142 of the rear differential 12 and the height N2 to the brake plate 140 at the uppermost end of the transmission brake 42 are measured.

Figure 20:
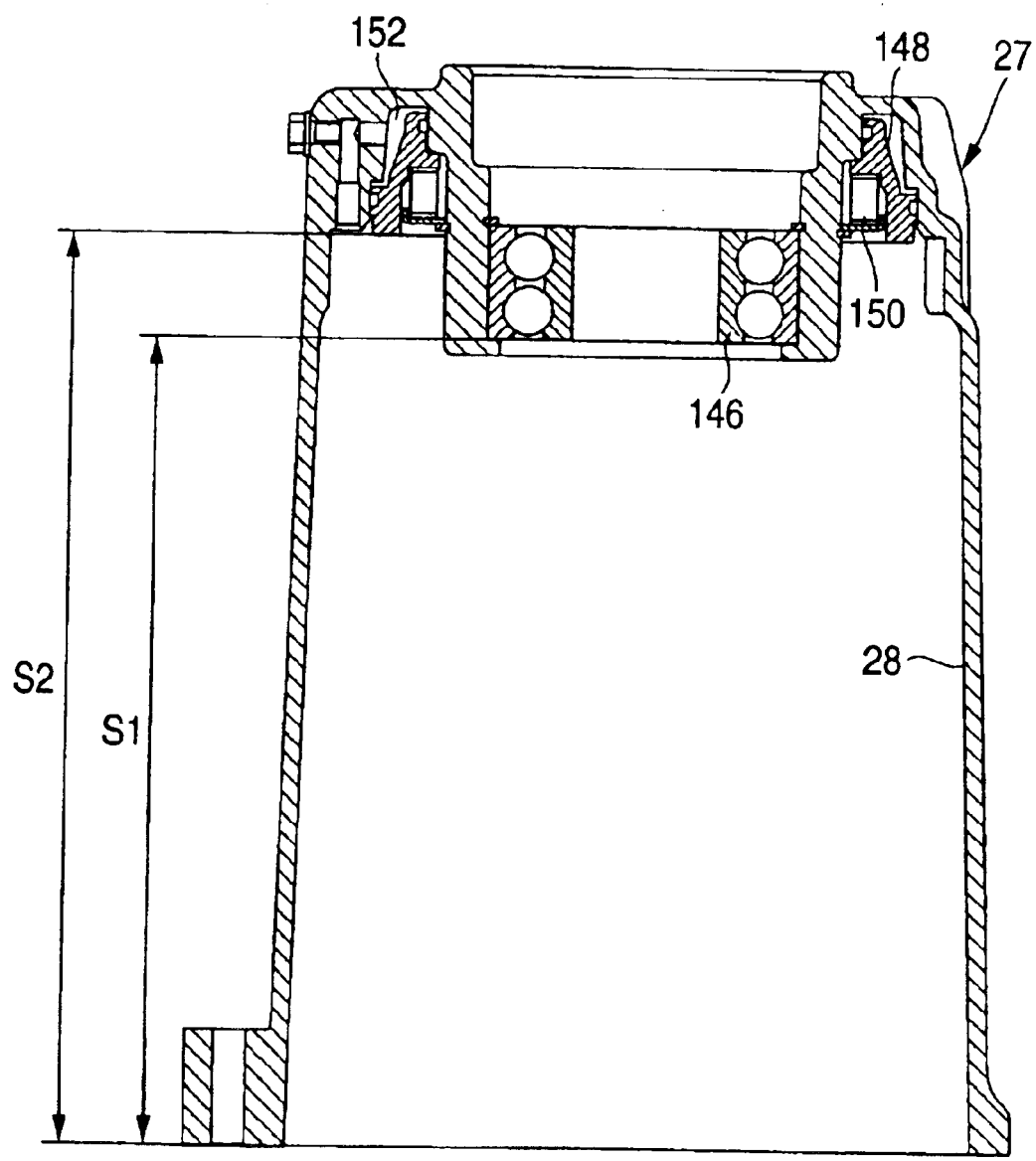
FIG. 20 is a cross-sectional view showing a process for measuring dimensions S1, S2 of a front case sub-assembly.

Next, as shown in FIG. 20, dimensions S1, S2 of two locations of a front case sub-assembly 27 which is assembled in a separate process are measured. The front case sub-assembly 27 includes a casing 28, bearings 146 which rotatably bear the input shaft 30, the hydraulic piston 148 of the transmission brake 42 and the coil spring 150.

Thickness are selected for the shim 142 and the brake end plate 144 with a view to set a specified clearance from a difference between N1 and N2 which were measured in the previous process.

The transmission hydraulic piston 148 is incorporated in the front case sub-assembly 27, and in order to set the clearance of the transmission brake, the dimension S2 from a mating surface between the casing 28 of the transfer apparatus 10 and the casing 54 of the rear differential 12 to an end surface of the hydraulic piston 148 needs to be measured.

Performing this measuring process during the assembling processes of the whole rear differential 12 leads to the deterioration in working efficiency of the total assembly operation. However, since the front case sub-assembly according to the embodiment is not affected by dimensions of the peripheral components, this measuring process can be separated from the assembling processes of the whole rear differential 12.

Figure 21:
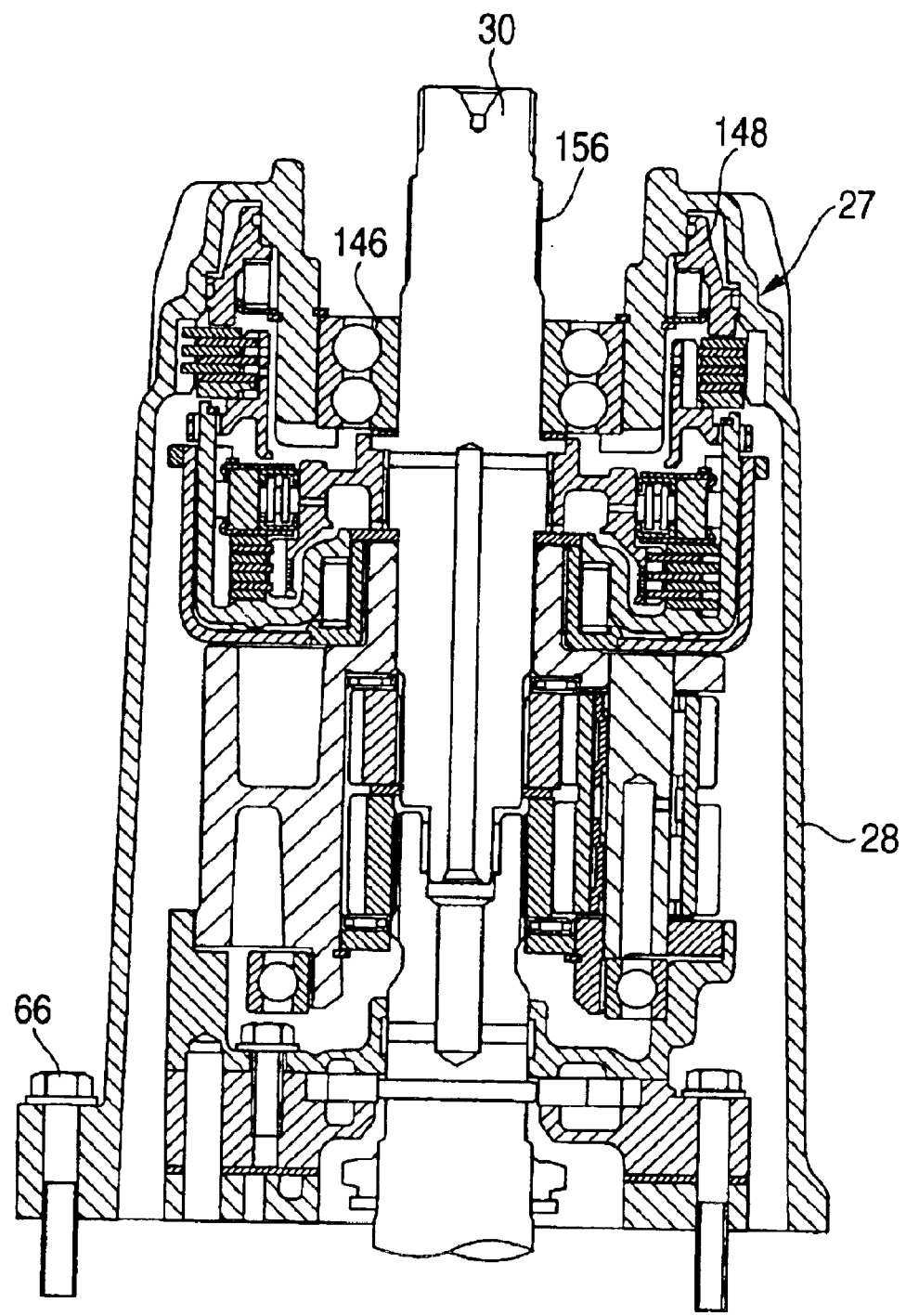
FIG. 21 is a cross-sectional view showing a process for assembly of the front case sub-assembly.

Next, as shown in FIG. 21, the front case sub-assembly 27 is assembled. An inner race of the bearing 146 is press fitted over the input shaft 30, and the casing 28 is fastened to the casing 54 of the rear differential 12 with screws 66. As this occurs, the brake clearance of the transmission brake 42 and the axial clearance of the respective components incorporated in the casing 28 become specified values.

Figure 22:
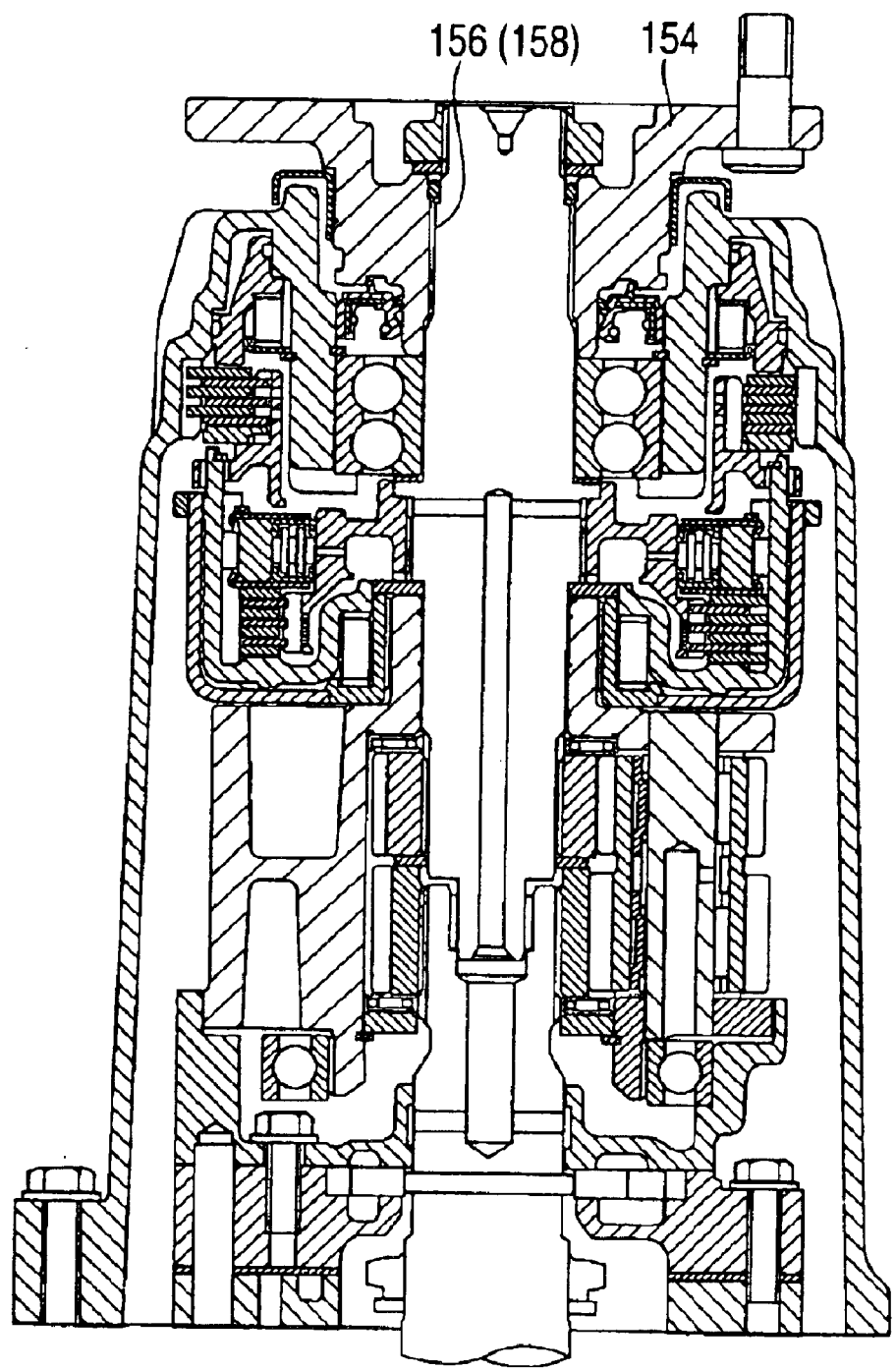
FIG. 22 is a cross-sectional view showing a process for assembly of a companion flange.

Lastly, as shown in FIG. 22, the companion flange 154 is assembled onto the input shaft 30. Namely, the companion flange 154 is fixed onto the input shaft 30 by fitting the splines 156, 158 together.

The operation of the speed increasing apparatus 10 and the rear differential 12 according to the embodiment that have been described heretofore will be described below.

The transmission brake 42 is in an OFF mode in which no oil pressure is introduced to the oil chamber 152 of the hydraulic piston 148, the direct connective clutch 40 is engaged by virtue of the biasing force of the coil spring 118.

Thus, the input shaft 30 and the planetary carrier 78 are connected together via the direct connective clutch 40 and the one-way clutch 120, whereby the planetary carrier 78 encompassing the pinion gears 84, 86 and the first and second sun gears 88, 94 rotate together. Namely, these constituent components rotate as a block or unit.

As this occurs, the pinion gears 84, 86 do not rotate on their axes but rotate together with the input shaft 30 and the output shaft 32. Namely, power inputted from the companion flange 154 is outputted to the output shaft (hypoid pinion shaft) 32 as it is.

In the event that the left and right electromagnetic coils 60 of the rear differential 12 are switched off in this direct connecting mode, since the respective brake mechanisms 51 are not activated, the respective sun gears of the planetary gear sets 50A, 50B idly rotate around the left and right rear axles 24, 26.

Consequently, the driving force (torque) of the hypoid pinion gear 32 is not transmitted to the left and right rear axles 24, 26 at all. In this case, the rear wheels spin, and all the driving force is directed to the front wheels, whereby the vehicle operates as a two-wheel drive vehicle.

In the event that a predetermined amount of current is conducted to the left and right electromagnetic coils 60 so that the left and right multi-plate brakes 52 are fully applied via the pistons 64, the sun gears of the planetary gear sets 50A, 50B are fixed to the casing 54, respectively.

Thus, the driving force of the hypoid pinion shaft 32 is transmitted to the left and right rear axles 24, 26 via the ring gears of the planetary gear sets 50A, 50B, the planet gears and the planet carriers.

Consequently, the driving force of the input shaft 30 is equally divided and is then transmitted to the left and right rear axles 24, 26. As a result, the four-wheel drive vehicle is put in the four-wheel drive mode to thereby be allowed to drive straight ahead.

On the other hand, when turning a corner having a small turning radius in the four-wheel drive mode in low and middle speed ranges, an oil pressure is introduced to the oil chamber 152 of the transmission brake 42 so as to push the hydraulic piston 148 in the rightward direction to thereby activate the transmission brake 42.

At the same time as this occurs, the brake inner hub 136 of the transmission brake 42 pushes the clutch piston 116 of the direct connective clutch 40 in the rightward direction against the biasing force of the coil spring 118, so that the engagement of the direct connective clutch 40 is released.

By this operation, the clutch guide 104 is fixed to the casing 28 via the transmission brake 42, and the planetary carrier 78 coupled with the clutch guide 104 is then fixed to the casing 28.

Even with the planetary carrier 78 being fixed to the casing 28, the small-diameter pinion gear 84 and the large-diameter pinion gear 86 which are held within the planetary carrier 78 can still rotate, and in this condition, the planetary carrier sub-assembly 38 part becomes a gear train having a certain gear ratio, whereby a change in speed is established between the input shaft 30 and the output shaft (hypoid pinion shaft) 32.

Here, setting the number of teeth (N1) of the sun gear 88, the number of teeth (N2) of the small-diameter pinion gear 84, the number of teeth (N3) of the large-diameter pinion gear 86 and the number of teeth (N4) of the sun gear 94 to establish the following relationship among them, an increase in speed is established between the input shaft 30 and the output shaft 32.

$$\frac{N1}{N2} \cdot \frac{N3}{N4} > 1.0 \qquad \text{[Equation No. 1]}$$

In this embodiment, the numbers of teeth of the respective pinion gears 84, 86 and the first and second sun gears 88, 94 are set so that an increased speed ratio becomes 1.07.

Figure 23:
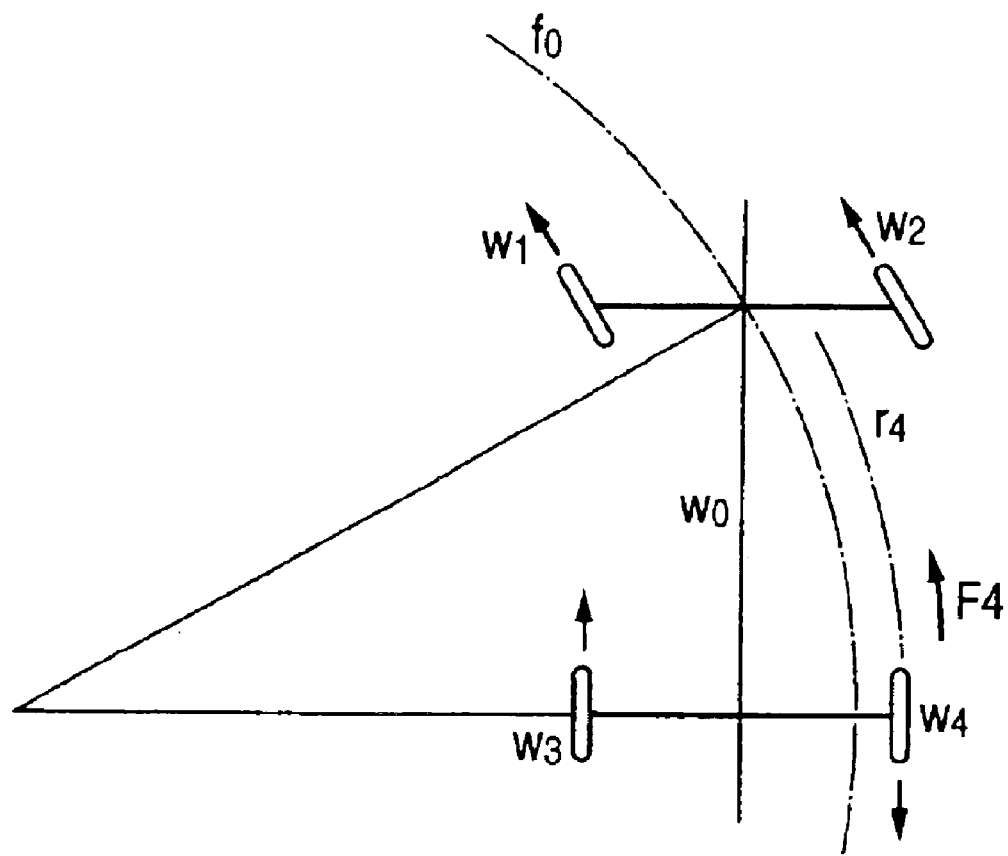
FIG. 23 is an explanatory view showing a state in which a four-wheel drive vehicle is turning left.

Assume that the vehicle turns left as shown in FIG. 23 in a state in which the rotational speed of the output shaft (the hypoid pinion shaft) 32 is made larger than that of the input shaft 30. As this occurs, more current is conducted to the right-hand side electromagnetic coil 60 than to the left-hand side electromagnetic coil 60 in the rear differential, so that the right-hand side brake mechanism 51 is applied more strongly than the left-hand side brake mechanism 51.

This allows the driving force of the hypoid pinion shaft 32 to be distributed more to the right rear axle 26, and since this allows, in turn, the driving torque of the rear outer wheel of the turning vehicle to become larger than the driving torque of the rear inner wheel thereof, as indicated by an arrow 4 in FIG. 23, the turning performance in, for example, the low to middle speed ranges can be enhanced.

In addition, on the contrary, the driving torque of the rear inner wheel of the turning vehicle is allowed to be made larger than the driving force of the rear outer wheel thereof, whereby a required running stability can be obtained in a high speed range.

Thus, by controlling the values of current conducted to the left and right electromagnetic coils 60, the driving force of the input shaft 30 can arbitrarily be distributed to the left and right rear axles 24, 26 in the direct connecting mode or by increasing the rotational speed thereof by the speed increasing apparatus 10, whereby an optimum turning control and/or easy escape from a trap in the muddy road can be attained.

A switch from the direct connecting mode to the speed increasing mode will be controlled as below. A threshold for the steering effort or steering angle is set relative to the vehicle speed, and the speed increasing apparatus 10 is controlled so as to be put in the speed increasing mode when the steering effort or steering angle exceeds the threshold so set.

In addition, the rear differential 12 will be controlled as below. Values of current that is conducted to the electromagnetic coils 60 relative to the steering effort or steering angle are set in advance as a map.

By using this, the values of current that is conducted to the left and right electromagnetic coils 60 are controlled based on the turning angle and the steering effort or steering angle, the driving torque of the rear outer wheel of the turning vehicle is controlled so as to become larger than the driving torque of the rear inner wheel thereof.

While there has been described in connection with the preferred embodiments of the present invention, it will be obvious to those skilled in the art that various changes and modifications may be made therein without departing from the present invention, and it is aimed, therefore, to cover in the appended claims all such changes and modifications as fall within the true spirit and scope of the present invention.

According to the first aspect of the present invention, since only the single actuator can be used to disengage the clutch while activating the transmission brake in a simultaneous fashion, it is possible to provide the power transfer apparatus that is smaller in size and lighter in weight. In addition, since the clutch and the transmission brake are serially disposed in the axial direction, the outside diameter of the power transfer apparatus can be made small.

Furthermore, since when the actuator is activated, the engagement of the clutch is gradually released while the transmission brake is gradually applied, there is caused no interruption in transmitting power from the input shaft to the output shaft, thereby making it possible to prevent the occurrence of a shock when a change in speed takes place.

According to the second aspect of the present invention, since the one-way clutch is interposed between the clutch inner hub and the clutch guide, the load generated when the input shaft and the output shaft are directly connected to each other can be partially borne by the one-way clutch, thereby making it possible to reduce the load capacity of the clutch.

According to the third aspect of the present invention, even if the power transmission member such as the clutch inner hub is disposed on the inner diameter side, the control (On/Off) of the clutch can be implemented on the outside diameter side.

What is claimed is:

1. A power transfer apparatus provided between an input shaft and an output shaft for selectively changing the speed of the output shaft relative to the speed of the input shaft, the power transfer apparatus comprising:
    a clutch having a clutch inner hub fixed to the input shaft, a clutch guide, a plurality of clutch discs attached to the clutch inner hub, a plurality of clutch plates attached to the clutch guide so as to be disposed alternately with the clutch discs, a clutch piston and biasing unit for biasing the clutch piston in a direction in which the clutch discs engage with the clutch plates;
    a transmission brake serially disposed in an axial direction of the clutch and having a brake inner hub coupled with the clutch piston at one end thereof, a plurality of brake discs coupled with the brake inner hub and a plurality of brake plates coupled with a casing in such a manner as to be disposed alternately with the brake discs;
    an actuator serially disposed in an axial direction of the transmission brake for disengaging the clutch against force of the biasing unit at the same time of activating the transmission brake; and
    a planetary carrier sub-assembly serially disposed in the axial direction of the clutch and having a planetary carrier rotatably disposed around the input shaft and the output shaft and coupled with the clutch guide, a first pinion gear rotatably carried on the planetary carrier, a second pinion gear having the number of teeth which is different from that of the first pinion gear, a first sun gear fixed to the input shaft and meshing with the first pinion gear and a second sun gear fixed to the output shaft and meshing with the second pinion gear,
    wherein the clutch, transmission brake, planetary carrier sub-assembly and actuator are serially disposed along the axial direction, and radial positions of the clutch, transmission brake, planetary carrier sub-assembly and actuator overlap each other.

2. A power transfer apparatus as set forth in claim 1, wherein the clutch further comprises a one-way clutch interposed between the clutch inner hub and the clutch guide.

3. A power transfer apparatus as set forth in claim 1, wherein the clutch piston is disposed within a space defined between the clutch guide and a radial out side of the clutch plates so as to be extended in the axial direction of the clutch.

4. A power transfer apparatus as set forth in claim 1, wherein the first and second pinion gears are formed integrally.

5. A power transfer apparatus as set forth in claim 1, wherein the input shaft and the output shaft are coaxially disposed.

6. A power transfer apparatus as set forth in claim 1, wherein
    the casing accommodates at least a portion of the input shaft and at least a portion of the output shaft, the clutch, the transmission brake, the actuator and the planetary carrier sub-assembly.

7. A power transfer apparatus as set forth in claim 1, further comprising;
    an oil pump sub-assembly for activating the actuator.

8. A power transfer apparatus as set forth in claim 7, wherein the oil pump sub-assembly is serially disposed in the axial direction of the output shaft.

9. A power transfer apparatus provided between an input shaft and an output shaft for selectively changing the speed of the output shaft relative to the speed of the input shaft, the power transfer apparatus comprising:
    a clutch having a clutch inner hub fixed to the input shaft, a clutch guide, a plurality of clutch discs attached to the clutch inner hub, a plurality of clutch plates attached to the clutch guide so as to be disposed alternately with the clutch discs, a clutch piston and biasing unit for biasing the clutch piston in a direction in which the clutch discs engage with the clutch plates;
    a transmission brake serially disposed in an axial direction of the clutch and having a brake inner hub coupled with the clutch piston at one end thereof, a plurality of brake discs coupled with the brake inner hub and a plurality of brake plates coupled with a casing in such a manner as to be disposed alternately with the brake discs;
    an actuator serially disposed in an axial direction of the transmission brake for disengaging the clutch against force of the biasing unit at the same time of activating the transmission brake; and
    a planetary carrier sub-assembly serially disposed in the axial direction of the clutch and having a planetary carrier rotatably disposed around the input shaft and the output shaft and coupled with the clutch guide, a first pinion gear rotatably carried on the planetary carrier, a second pinion gear having the number of teeth which is different from that of the first pinion gear, a first sun gear fixed to the input shaft and meshing with the first pinion gear and a second sun gear fixed to the output shaft and meshing with the second pinion gear,
    wherein the clutch further comprises a one-way clutch interposed between the clutch inner hub and the clutch guide.

10. A power transfer apparatus as set forth in claim 9, wherein the clutch piston is disposed within a space defined between the clutch guide and a radial out side of the clutch plates so as to be extended in the axial direction of the clutch.

11. A power transfer apparatus as set forth in claim 9, wherein the first and second pinion gears are formed integrally.

12. A power transfer apparatus as set forth in claim 9, wherein the input shaft and the output shaft are coaxially disposed.

13. A power transfer apparatus as set forth in claim 9, further comprising;

an oil pump sub-assembly for activating the actuator.

14. A power transfer apparatus as set forth in claim 13, wherein the oil pump sub-assembly is serially disposed in the axial direction of the output shaft.

15. A power transfer apparatus provided between an input shaft and an output shaft for selectively changing the speed of the output shaft relative to the speed of the input shaft, the power transfer apparatus comprising:

a clutch having a clutch inner hub fixed to the input shaft, a clutch guide, a plurality of clutch discs attached to the clutch inner hub, a plurality of clutch plates attached to the clutch guide so as to be disposed alternately with the clutch discs, a clutch piston and biasing unit for biasing the clutch piston in a direction in which the clutch discs engage with the clutch plates;

a transmission brake serially disposed in an axial direction of the clutch and having a brake inner hub coupled with the clutch piston at one end thereof, a plurality of brake discs coupled with the brake inner hub and a plurality of brake plates coupled with the casing in such a manner as to be disposed alternately with the brake discs;

an actuator serially disposed in an axial direction of the transmission brake for disengaging the clutch against force of the biasing unit at the same time of activating the transmission brake;

a planetary carrier sub-assembly serially disposed in the axial direction of the clutch and having a planetary carrier rotatably disposed around the input shaft and the output shaft and coupled with the clutch guide, a first pinion gear rotatably carried on the planetary carrier, a second pinion gear having the number of teeth which is different from that of the first pinion gear, a first sun gear fixed to the input shaft and meshing with the first pinion gear and a second sun gear fixed to the output shaft and meshing with the second pinion gear; and an oil pump sub-assembly for activating the actuator, wherein the oil pump sub-assembly is serially disposed in the axial direction of the output shaft.

16. A power transfer apparatus as set forth in claim 15, wherein the clutch further comprises a one-way clutch interposed between the clutch inner hub and the clutch guide.

17. A power transfer apparatus as set forth in claim 15, wherein the clutch piston is disposed within a space defined between the clutch guide and a radial out side of the clutch plates so as to be extended in the axial direction of the clutch.

18. A power transfer apparatus as set forth in claim 15, wherein the first and second pinion gears are formed integrally.

19. A power transfer apparatus as set forth in claim 15, wherein the input shaft and the output shaft are coaxially disposed.

* * * * *